(12) United States Patent
Milby

(10) Patent No.: US 8,838,608 B2
(45) Date of Patent: Sep. 16, 2014

(54) VIRTUAL R-TREE MAPPED TO AN EXTENDIBLE-HASH BASED FILE SYSTEM

(75) Inventor: Gregory Howard Milby, San Marcos, CA (US)

(73) Assignee: Teradata US, Inc., Dayton, OH (US)

( * ) Notice: Subject to any disclaimer, the term of this patent is extended or adjusted under 35 U.S.C. 154(b) by 420 days.

(21) Appl. No.: 12/972,911

(22) Filed: Dec. 20, 2010

(65) Prior Publication Data

US 2012/0158736 A1    Jun. 21, 2012

(51) Int. Cl.
G06F 17/00    (2006.01)
G06F 17/30    (2006.01)

(52) U.S. Cl.
CPC ................................. *G06F 17/3033* (2013.01)
USPC ............................ 707/743; 707/713; 707/737

(58) Field of Classification Search
None
See application file for complete search history.

(56) References Cited

U.S. PATENT DOCUMENTS

| | | | |
|---|---|---|---|
| 5,603,021 A * | 2/1997 | Spencer et al. ....................... | 1/1 |
| 5,940,840 A * | 8/1999 | Eshel et al. .......................... | 1/1 |
| 6,449,613 B1 * | 9/2002 | Egolf et al. ........................... | 1/1 |
| 6,700,574 B1 | 3/2004 | Song | |
| 7,634,487 B2 | 12/2009 | Bae et al. | |
| 2007/0016600 A1 | 1/2007 | Bae et al. | |
| 2010/0057407 A1 | 3/2010 | Fitt | |
| 2011/0066617 A1 * | 3/2011 | Liu et al. ....................... | 707/737 |

OTHER PUBLICATIONS

Beckman et al. ("The R*-tree: an efficient and robust access method for points and rectangles" ACM May 1990 proceedings, p. 322-331).*

* cited by examiner

*Primary Examiner* — Ajay Bhatia
*Assistant Examiner* — Miranda Huang
(74) *Attorney, Agent, or Firm* — Schwegman, Lundberg & Woessner, P.A.

(57) ABSTRACT

Techniques for mapping a virtual R-Tree to an extensible-hash based file system for databases are provided. Spatial data is identified within an existing file system, which stores data for a database. Rows of the spatial data are organized into collections; each collection represents a virtual block. The virtual blocks are used to form an R-Tree spatial index that overlays an existing index for the database on the existing file system. Each row within its particular virtual block includes a pointer to its native storage location within the existing file system.

15 Claims, 5 Drawing Sheets

VIRTUAL R-TREE MAPPED TO AN EXTENDIBLE-HASH BASED FILE SYSTEM

BACKGROUND

Traditional Structured Query Language (SQL) data types have all fallen into the categories of numeric data types, character data types, binary data types, and date and time interval types. All of these initial SQL data type offerings were scalar data types that fit nicely into an extendible-hashing based file system environment, in which a hash-function was executed against the data value corresponding to a particular data type and the result of the hash function was then utilized to determine where the data was to be stored within the file system. Later, when a particular data value was being searched for, the same hash-function could be applied to that value and the result used to find the matching data (if any) within the file system. Another subject area in which this scalar-data-type hashing scheme seemed well fitted, was with regards to efficiently resolving queries involving the relational operators: >,<,=, etc.

Most modern commercial databases provide the user with an ability to index any one of their scalar data type columns. The indexing scheme typically employs the same storage/retrieval mechanism that is available for the storage of the data itself. Thus to retrieve the row or rows associated with a particular index search-value, the search-value is first hashed, and the hashed-value is then used to retrieve the row or rows from the database that fulfill the search condition.

Recently, however, spatial data types were introduced into the ANSI SQL standard. Spatial data types are not scalar and in fact represent for the most part multi-dimensional shapes: Circles, Squares, Rectangles, Polygons, etc. Unlike scalar SQL data types, spatial data types have a large number of SQL operators that can be applied against them: touches, intersects, overlaps, within, disjoint, crosses, distance, etc.; all of which must be executed in an efficient manner. The dilemma is that spatial data types do not fit in well with either an extendible-hash based file system or an extendible-hash based indexing mechanism. Although there has been research that has investigated mapping multi-dimensional objects, represented by multi-dimensional coordinates, into a linear value, a major shortfall with this approach is that there is no way to perform the linear mapping and a the same time maintain the spatial relationships between mapped objects in order to efficiently execute the aforementioned spatial operations.

In other words, one can perform the mapping, but then one will find a difficult time in executing such operations as crosses, touches, etc., in an efficient manner. To perform these operations in an efficient manner, one would need a specialized spatial construct such as an R-Tree-based index. This index provides a mechanism by which spatial objects are stored/retrieved while simultaneously maintaining inter-spatial object relationships. An R-Tree approach is built around the concept of a Minimum Bounding Rectangle (MBR). The MBR is used to decide where data is to be stored within the file system/index containing the spatial data.

However, conventional approaches that attempt to provide R-Tree indexes require the R-Tree to be built and constructed out of physical disk blocks. So, that changes to existing conventional indexes to accommodate an R-Tree becomes essentially impractical to achieve and risky to existing database file systems.

SUMMARY

In various embodiments, techniques for mapping a Virtual R-Tree to an extensible-hash based file system are presented. According to an embodiment, a method for mapping a Virtual R-Tree to an extensible-hash based file system is provided.

Specifically, hash values are assigned to virtual blocks of data that links to rows of spatial data included within a database. The database includes an existing hash-based index using an existing file system. Next, the virtual blocks are organized into collections; each collection includes a same hash value and represents a single virtual block. Finally, an R-Tree is formed from the collections of the virtual blocks. The R-Tree represents an overlay spatial index of the existing hash-based index on the existing file system.

DETAILED DESCRIPTION

Figure 1A:
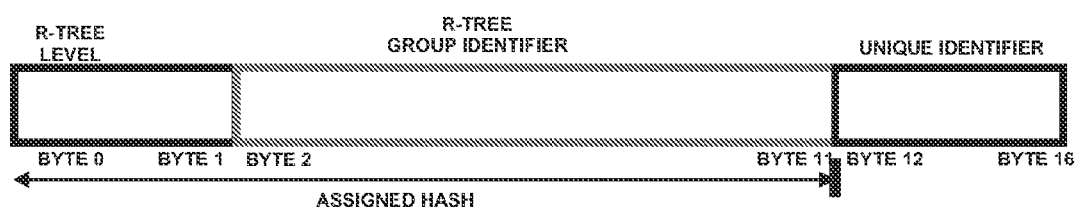
FIG. 1A is an example illustration for row key for a virtual block of a virtual R-Tree, according to an example embodiment.

FIG. 1A is an example illustration for row key for a virtual block of a virtual R-Tree, according to an example embodiment.

The traditional approach to determining where in an extendible-based file system an index row is to be stored, is to hash the index key and then use the hash value to determine which disk block is used to store the index data row. For embodiments presented herein, hash values are not calculated, rather they are intelligently assigned. Tightly coupled with this intelligent assignment is the concept of a virtual block. A virtual block is a logical collection of rows all stored under the same "assigned" hash value. A Virtual R-Tree is an R-Tree index that is constructed from a series of Virtual Blocks.

The embodiments discussed herein assume that each row is headed by a 16 byte row-key: 12 bytes of hash; 4 bytes of unique data. The row hash is further divided as: 2 bytes for a tree level; and 10 bytes for a group identifier.

Note that the configuration depicted in the FIG. 1A supports: a 65,536 Level R-Tree; approximately $3^{26}$ group identifiers; and $4.2^9$ unique identifiers.

Figure 1B:
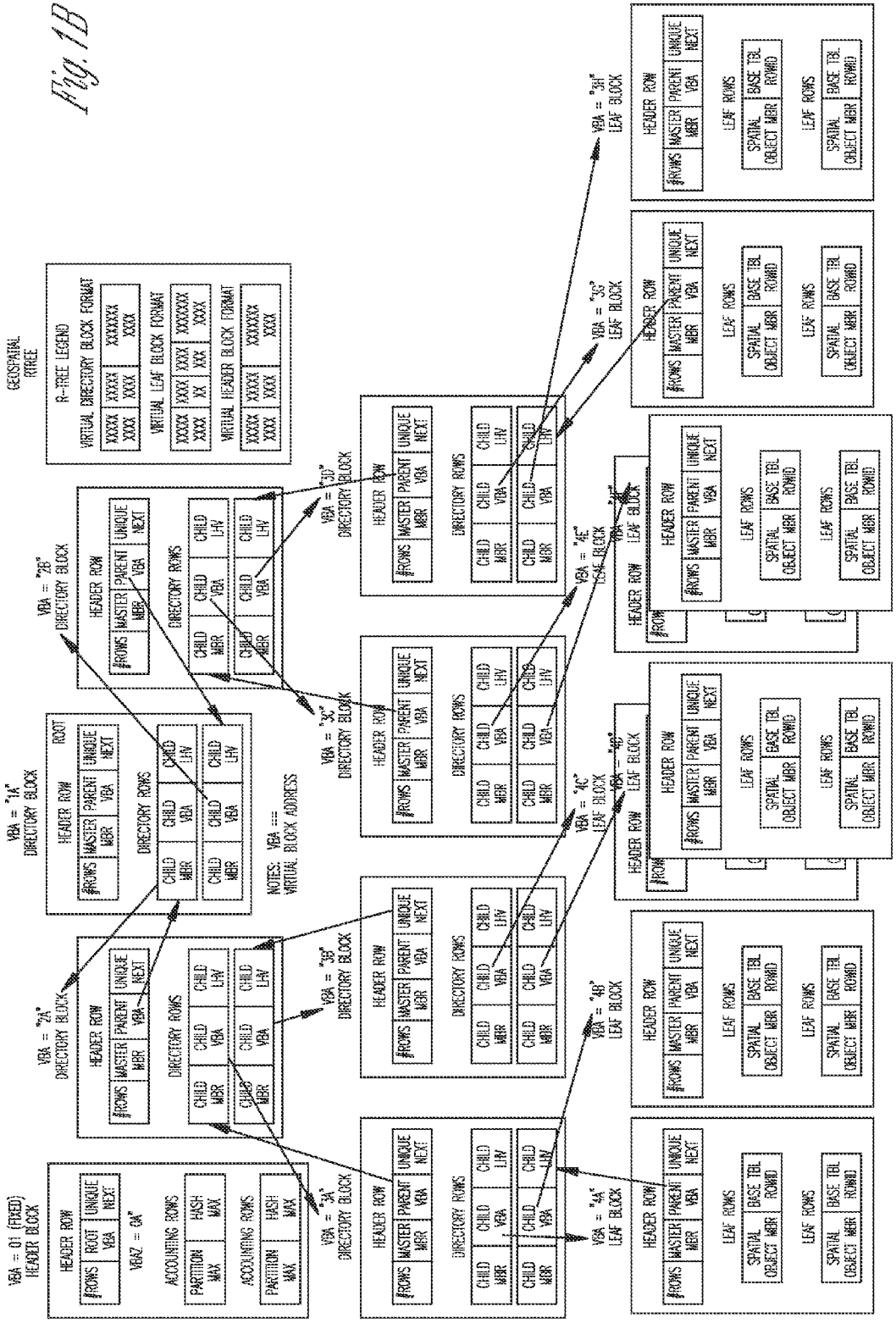
FIG. 1B is depiction of a Virtual R-Tree, according to an example embodiment.

FIG. 1B is a depiction of a Virtual R-Tree, according to an example embodiment.

A Virtual R-Tree is assembled from the following types of virtual blocks: an R-Tree header block, an R-Tree directory block, and an R-Tree leaf block. Each of these types is now discussed.

The R-Tree header block includes book-keeping context for an entire R-Tree. The R-Tree header block resides at a "well-known" predetermined hash address. The $1^{st}$ row in the block serves as a virtual block header; this is followed by additional rows, one row per R-Tree logical level that itself contains the current group and unique counts pertinent to particular R-Tree level.

The R-Tree directory block includes a $1^{st}$ row in the block that serves as a virtual block header. The virtual block header row minimally includes a hash assignment that serves as a back-pointer to the parent block. Subsequent rows are of the form: "MBR, ASSIGNED HASH." The assigned hash serves as a pointer to either an R-Tree directory block or an R-Tree leaf block residing at the next logical level down. The R-Tree directory block sits at the topmost level of the R-Tree and is stored using a "well-known" predetermined hash address.

The R-Tree leaf block includes a $1^{st}$ row in the block that serves as a virtual block header. The virtual block header row minimally includes a hash assignment that serves as a back-pointer to the parent block. Subsequent rows are of the form: "MBR, Spatial Object Identifier (SOID)." The SOID identifier is for the spatial object that is being indexed.

It is to be noted that because the R-Tree header block is stored using a well-know predetermined hash address, it can always be retrieved. Once the R-Tree header block has been retrieved, it includes sufficient context to access all other virtual blocks within the R-Tree.

A complete Virtual R-Tree is depicted in the FIG. 1B.

The techniques discussed herein above and below enable commercial database vendors to incorporate an R-Tree spatial index into their existing database infrastructure without requiring changes to their non-spatial extendible hash-based file system.

The approaches herein also allow for the incorporation of an R-Tree into commercial databases so as to enable spatial queries that operate with improved performance with respect to accessing database rows via spatial predicates and joining of database tables on a spatial bind condition.

The techniques herein also introduce a virtual storage block that can be applicable to efforts that incorporate other exotic-class (user-defined class) indexes into commercial database systems.

FIG. 1B is depiction of a Virtual R-Tree, according to an example embodiment.

Figure 2:
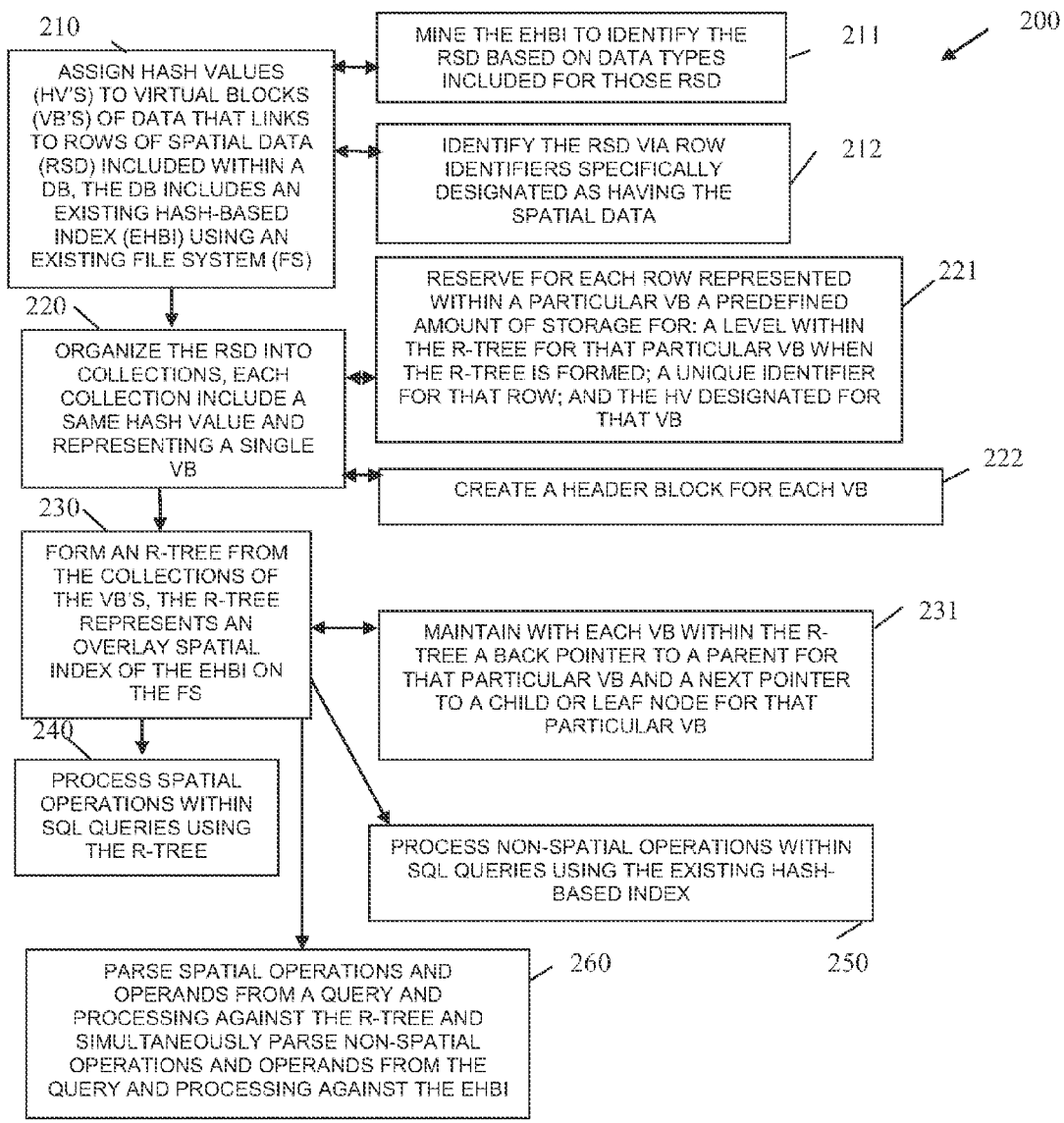
FIG. 2 is a diagram of a method for mapping a Virtual R-Tree to an extensible-hash based file system, according to an example embodiment.

FIG. 2 is a diagram of a method 200 for mapping a virtual R-Tree to an extensible-hash based file system, according to an example embodiment. The method 200 (hereinafter "virtual R-Tree mapper") is implemented as instructions within a computer-readable storage medium that execute on a plurality of processors, the processors specifically configured to execute the virtual R-Tree mapper. Moreover, the virtual R-Tree mapper is programmed within a non-transitory computer-readable storage medium. The virtual R-Tree mapper may also be operational over a network; the network is wired, wireless, or a combination of wired and wireless.

At 210, the virtual R-Tree mapper assigns hash values to virtual blocks of data that links rows of spatial data. The rows of spatial data are included within a database and the database is stored on an existing file system. Furthermore, the database includes an existing extensible-hash based index. That is, the virtual blocks are pointers to the physical storage of the existing file system; the pointers link from the virtual blocks to rows of spatial data. Moreover, typically a hash is computed for content, in this case the hash is assigned by the virtual R-Tree mapper.

According to an embodiment, at 211, the virtual R-Tree mapper mines the existing extensible-hash based index to identify the rows of spatial data based on data types included for those rows of spatial data within the existing index. So, the database is essentially parsed for purposes of identifying rows that include spatial data (non scalar data).

In another case, at 212, the virtual R-Tree mapper identifies the rows of spatial data via row identifiers (included or accessible on the existing file system via the existing index). The row identifiers are specifically designated as having the spatial data. This can be achieved in a number of ways. For instance, a table can be constructed and fed as input to the virtual R-Tree mapper where the table includes each row identifier. In another case, an interface to the virtual R-Tree mapper can be used by an administrator to input the row identifiers.

At 220, the virtual R-Tree mapper organizes the rows of spatial data into collections of rows. Each collection includes a same assigned hash value and each collection represents a single virtual block. In other words, the rows of spatial data are logically grouped and each grouping represents a particular virtual block.

In an embodiment, at 221, the virtual R-Tree mapper reserves for each row that is represented within a particular virtual block a predefined amount of storage for: a level within an R-Tree (discussed below with reference to the processing at 230) for that particular virtual block when the R-Tree if formed, a unique identifier for the row being processed, and the assigned hash value designated for the particular virtual block. A proposed layout of such storage reservation and usage was presented above with reference to the FIG. 1A and with further discussion and illustration in the FIG. 1B.

In another case, a header block is created for each virtual block. Again, this discussion was provided above with reference to the FIG. 1B.

At 230, the virtual R-Tree mapper forms an R-Tree from the collections of the virtual blocks. The R-Tree represents an overlay index of the existing extensible-hash based index stored within the existing file system. It is noted that this overlay index does not require any modification or re-organizing of the primary data associated with the database. That is, the existing index and physical storage for the database remains unchanged. The R-Tree (overlay index) is superimposed on top of the existing index.

According to an embodiment, at 231, the virtual R-Tree mapper maintains each virtual block within the R-Tree a back pointer to a parent node for that particular virtual block and the virtual R-Tree mapper maintains one or more next pointers to one or more child or leaf nodes for that particular virtual block. This was discussed above with reference to the FIG. 1B. This also permits the R-Tree to be efficiently traversed.

Once the overlay index for the rows of spatial data has been formed (via the R-Tree) a variety of beneficial features are capable of being achieved.

For example, at 240, the virtual R-Tree mapper processes spatial operations within SQL queries using the R-Tree. So, a variety of existing or custom-defined spatial operations can appear and be processed within SQL queries.

Additionally, at 250, the virtual R-Tree mapper processes any non-spatial operations appearing within SQL queries using the existing extensible-hash based index. The operation and usage of the existing index remains unchanged and can be processed normally.

Still further, queries can include combinations of spatial and non-spatial operations intermixed within a query. Thus, at 260, the virtual R-Tree mapper parses spatial operations and spatial operands from a submitted query and processes that against the R-Tree. Simultaneously, the virtual R-Tree mapper parses non-spatial operations and non-spatial operands from the query and processes that against the existing extensible-hash based index.

Figure 3:
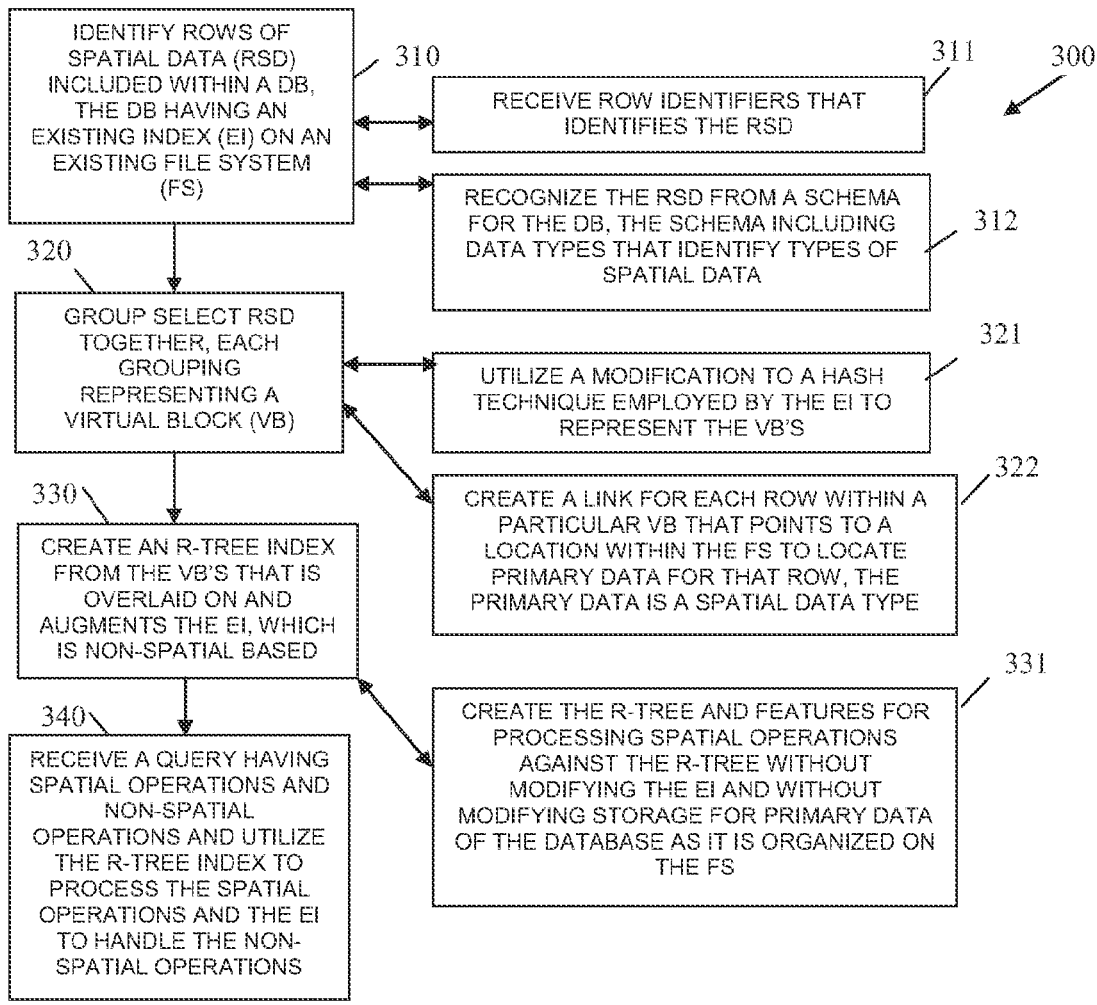
FIG. 3 is a diagram of another method for mapping a Virtual R-Tree to an extensible-hash based file system, according to an example embodiment.

FIG. 3 is a diagram of another method 300 for mapping a Virtual R-Tree to an extensible-hash based file system, according to an example embodiment. The method 300 (hereinafter "overlay service") is implemented as instructions within a computer-readable storage medium that execute on a plurality of processors, the processors specifically configured to execute the overlay service. Moreover, the overlay service is programmed within a non-transitory computer-readable storage medium. The overlay service may also be operational over a network; the network is wired, wireless, or a combination of wired and wireless.

The overlay service presents another in some cases enhanced perspective of the virtual R-Tree mapper represented by the method 200 of the FIG. 2.

At 310, the overlay service identifies rows of spatial data included within a database. The database having an existing index on an existing file system. That is, the physical storage of the primary data associated with the database remains unchanged with the processing of the overlay service as does the existing index provided for the database. The existing index is a scalar-based and extensible-hash based index for the database.

According to an embodiment, at 311, the overlay service receives row identifiers that identify the rows of spatial data. In this scenario, manual input or a semi-automated input (such as via a table) is used to provide the overlay service with the row identifiers for the spatial data included within the database.

In another situation, at 312, the overlay service recognizes the rows of spatial data from a schema for the database. The schema includes data types that identify the types of spatial data. The existing index can then be used to acquire the row identifiers for locating the rows on the physical storage within the existing file system.

At 320, the overlay service groups select rows of the spatial data together. Each grouping representing a virtual block. This was discussed above with reference to the FIGS. 1A-1B and 2.

In an embodiment, at 321, the overlay service utilizes a modification to a hash technique employed by the existing index to represent the virtual blocks. That is, the hash values are assigned rather than computed (which is what the existing index does—compute the hash values). Each same hash value represents a single virtual block and each virtual block including multiple rows of the spatial data that has been grouped together.

In one case, at 322, the overlay service creates a link for each row within a particular virtual block that points to a location within the file system to locate primary data for that row. The primary data is a spatial data type.

At 330, the overlay service creates an R-Tree index from the virtual blocks, which are overlaid on and augment the existing index (the existing index is scalar or non-spatial based). Each virtual block represents a MBR to form the R-Tree index.

According to an embodiment, at 331, the overlay service creates the R-Tree index and features for processing spatial operations against the R-Tree index without modifying the existing index and without modifying storage for primary data of the database as it is natively organized on the existing file system. In other words, the R-Tree and features that the R-Tree provides (SQL spatial-based operations) is achieved and implemented without modification to the existing storage of the database and without modification to the existing index associated with the database.

In one situation, at 340, the overlay service receives a query having spatial operations and non-spatial operations. The overlay service utilizes the R-Tree index to process the spatial operations and separately utilizes the existing index to handle the non-spatial (scalar) operations of the query.

Figure 4:
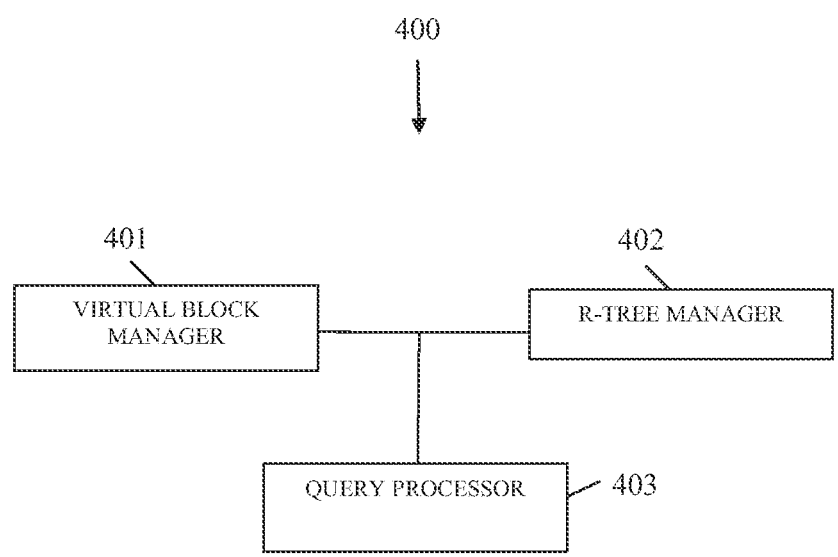
FIG. 4 is a diagram of a virtual R-Tree mapping system, according to an example embodiment.

FIG. 4 is a diagram of a virtual R-Tree mapping system 400, according to an example embodiment. The virtual R-Tree mapping system 400 is implemented, resides, and is programmed within a non-transitory computer-readable storage medium and executes on one or more processors specifically configured to execute the components of the virtual R-Tree mapping system 400. Moreover, the virtual R-Tree mapping system 400 may be operational over a network and the network is wired, wireless, or a combination of wired and wireless.

The virtual R-Tree mapping system 400 implements, inter alia, the techniques presented and described above with reference to the FIGS. 1A-B and FIGS. 2-3.

The virtual R-Tree mapping system 400 includes a virtual block manger 401 and an R-Tree manager 402. Also, in some embodiments, the virtual R-Tree mapping system 400 also includes a query processor 403. Each of these and their interactions with one another will now be discussed in turn.

The virtual block manager 401 is programmed within, resides within, and is implemented in a non-transitory computer-readable storage medium for execution on one or more processors. The processors are specifically configured and programmed to execute the virtual block manager 401. Aspects of the virtual block manager 401 were presented above in detail with reference to the FIGS. 1A-1B and 2-3.

The virtual block manager 401 is configured to organize rows of spatial data for a database into collections. Each collection represents a specific virtual block.

According to an embodiment, the virtual block manager 401 is configured to assign a same hash value to every row included within a particular virtual block. So, each collection of rows of spatial data is logically associated as a particular virtual block via a same assigned hash value. This was discussed above with reference to the FIGS. 1A-1B and 2-3.

Moreover, each virtual block represents a MBR used in the formation of the R-Tree index.

The R-Tree manager 402 is programmed within, resides within, and is implemented in a non-transitory computer-readable storage medium for execution on one or more processors. The processors are specifically configured and programmed to execute the R-Tree manager 402. Aspects of the R-Tree manager 402 were presented above in detail with reference to the FIGS. 1A-1B and 2-3.

The R-Tree manager 402 is configured to organize the virtual blocks into an R-Tree index for the database that is stored on an existing file system. Creation and usage of the R-Tree index does not alter the primary data stored on the database within the existing file system and does not alter any existing scalar indexes employed by the database.

According to an embodiment, the virtual R-Tree mapping system 400 also includes a query processor 403. The query processor 403 is programmed within, resides within, and is implemented in a non-transitory computer-readable storage medium for execution on one or more processors. The processors are specifically configured and programmed to execute the query processor 403. Some aspects of the query processor 403 were presented above with reference to the FIGS. 1A-1B and 2-3.

The query processor 403 is configured to process spatial operations identified in an SQL query against the R-Tree index and configured to process non-spatial (scalar) operations identifies in the query against the existing extensible-hash based index.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:

assigning, via a processor, hash values to virtual blocks of data that links to rows of spatial data included within a database, the database includes an existing hash-based index using an existing file system, the hash values are not computed based on the data and are assigned by an R-Tree Mapper to the virtual blocks;

organizing, via the processor, the rows of spatial data into collections, each collection include a same hash value and representing a single virtual block and the same hash value providing a back-pointer to a parent block, and reserving, for each row represented within a particular virtual block a predefined amount of storage for: a level within the R-Tree for that particular virtual block when the R-Tree is formed; a unique identifier for that row; and the assigned hash value designated for that virtual block, and creating a header block for each virtual block;

forming, via the processor, an R-Tree from the collections of the virtual blocks, the R-Tree representing an overlay spatial index of the existing hash-based index on the existing file system; and parsing, via the processor, spatial operations and operands from a query and processing against the R-Tree and simultaneously parsing, via the processor, non-spatial operations and operands from the query and processing against the existing hash-based index.

2. The method of claim 1 further comprising, processing, via the processor, spatial operations within Structured Query Language (SQL) queries using the R-Tree.

3. The method of claim 1 further comprising, processing, via the processor, non-spatial operations within Structured Query Language (SQL) queries using the existing hash-based index.

4. The method of claim 1, wherein assigning further includes mining the existing hash-based index to identify the rows of spatial data based on data types included for those rows.

5. The method of claim 1, wherein assigning further includes identifying the rows of spatial data via row identifiers specifically designated as having the spatial data.

6. The method of claim 1, wherein forming further includes maintaining with each virtual block within the R-Tree a next pointer to a child or leaf node for that particular virtual block.

7. A method, comprising:

identifying, via a processor, rows of spatial data included within a database, the database having an existing index on an existing file system;

grouping, via the processor, selected rows together, each grouping representing a virtual block and each block assigned a specific hash value that is not computed on the spatial data and that is assigned by an R-Tree Mapper block and the specific hash value providing a back-pointer to a parent block for that block, and reserving, for each row represented within a particular virtual block, a predefined amount of storage for: a level within the R-Tree for that particular virtual block when the R-Tree is formed; a unique identifier for that row; and the assigned hash value designated for that virtual block, and creating a header block for each virtual block;

creating, via the processor, an R-Tree index from the virtual blocks that is overlaid on and augments the existing index, which is non-spatial based; and receiving, via the processor, a query having spatial operations and non-spatial operations and utilizing the R-Tree index to process the spatial operations and the existing index to handle the non-spatial operations.

8. The method of claim 7, wherein identifying further includes receiving row identifiers that identifies the rows of spatial data.

9. The method of claim 7, wherein identifying further includes recognizing the rows of spatial data from a schema for the database, the schema including data types that identify types of spatial data.

10. The method of claim 7, wherein grouping further includes utilizing a modification to a hash technique employed by the existing index to represent the virtual blocks.

11. The method of claim 7, wherein grouping further includes creating a link for each row within a particular virtual block that points to a location within the existing file system to locate primary data for that row, the primary data is a spatial data type.

12. The method of claim 7, wherein creating further includes creating the R-Tree and features for processing spatial operations against the R-Tree without modifying the existing index and without modifying storage for primary data of the database as it is organized on the existing file system.

13. A processor-implemented system, comprising:

a virtual block manager programmed within a non-transitory computer-readable medium and to execute on a processor;

an R-Tree manager programmed within a non-transitory computer-readable medium and to execute on the processor; and a query processor programmed within a non-transitory computer-readable medium and to execute on the processor, the query processor configured to process spatial operations identified in a query against an R-Tree index and configured to process non-spatial operations identified in the query against an existing extensible-hash based index;

the virtual block manager configured to organize rows of spatial data into collections, each collection representing a virtual block, the R-Tree manager configured to organize the virtual blocks into the R-Tree index that overlays the existing extensible-hash based index for a database stored on an existing file system, an R-Tree mapper assigns a hash value to each of the virtual blocks that is not computed based on the spatial data block and that hash value providing a back-pointer to a parent block for that virtual block, and wherein a reservation is made, for each row represented within a particular virtual block, a predefined amount of storage for: a level within the R-Tree for that particular virtual block when the R-Tree is formed; a unique identifier for that row; and the assigned hash value designated for that virtual block, and creating a header block for each virtual block.

14. The system of claim 13, wherein the virtual block manager is further configured to assign a same hash value to every row included within a particular virtual block.

15. The system of claim 13, wherein each virtual block represents a minimum bounding rectangle.

* * * * *